(12) United States Patent
Jiang

(10) Patent No.: US 11,264,669 B2
(45) Date of Patent: Mar. 1, 2022

(54) BATTERY BOX AND BATTERY MODULE

(71) Applicant: CONTEMPORARY AMPEREX TECHNOLOGY CO., LIMITED, Fujian (CN)

(72) Inventor: Liwen Jiang, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 17/358,643

(22) Filed: Jun. 25, 2021

(65) Prior Publication Data
US 2021/0320361 A1 Oct. 14, 2021

Related U.S. Application Data

(63) Continuation of application No. PCT/CN2019/075820, filed on Feb. 22, 2019.

(30) Foreign Application Priority Data

Dec. 29, 2018 (CN) .......................... 201822254182.1

(51) Int. Cl.
*H01M 50/209* (2021.01)
*H01M 10/04* (2006.01)
*H01M 50/249* (2021.01)

(52) U.S. Cl.
CPC ..... *H01M 50/209* (2021.01); *H01M 10/0481* (2013.01); *H01M 50/249* (2021.01); *H01M 2220/20* (2013.01)

(58) Field of Classification Search
CPC .................. H01M 10/0481; H01M 50/209
See application file for complete search history.

(56) References Cited

U.S. PATENT DOCUMENTS

| 6,326,103 | B1 | 12/2001 | Ido et al. |
| 2017/0062783 | A1* | 3/2017 | Kim .................... H01M 50/209 |

FOREIGN PATENT DOCUMENTS

| CN | 1236191 A | 11/1999 |
| CN | 202695586 U | 1/2013 |

(Continued)

OTHER PUBLICATIONS

Machine translation of CN106129300A. (Year: 2016).*
International Search Report dated Oct. 12, 2019 issued in PCT/CN2019/075820.

*Primary Examiner* — Jonathan G Jelsma
(74) *Attorney, Agent, or Firm* — Scully Scott Murphy & Presser

(57) ABSTRACT

The present application provides a battery box and a battery module. The battery box includes two end plates and two side plates, in which the end plates and the side plates are connected end to end in sequence to enclose to form a cavity of the battery box; each of the end plates is respectively bent at different positions to form a plurality of reinforcing members and a plurality of supporting members, each of the reinforcing members is parallel to the bottom surface of the battery box, at least one supporting member is provided between any two adjacent reinforcing members; and the location where the reinforcing member is opposite to the supporting member is a connecting portion, in which a connecting member of the battery box passes through the connecting portion and is connected to a case of a battery pack.

16 Claims, 3 Drawing Sheets

(56) References Cited

FOREIGN PATENT DOCUMENTS

| CN | 106129300 | A | | 11/2016 |
|---|---|---|---|---|
| CN | 206849895 | U | * | 1/2018 |
| CN | 207165636 | U | * | 3/2018 |
| CN | 207489956 | U | | 6/2018 |
| CN | 108878702 | A | * | 11/2018 |

* cited by examiner

BATTERY BOX AND BATTERY MODULE

CROSS-REFERENCES TO RELATED APPLICATIONS

This application is a continuation of International Application No. PCT/CN2019/075820, filed on Feb. 22, 2019 which claims priority to Chinese Patent Application No. 201822254182.1, filed with the Chinese Patent Office on Dec. 29, 2018. The disclosures of the aforementioned applications are hereby incorporated by reference in their entireties.

TECHNICAL FIELD

The present application relates to the technical field of batteries, and in particular, relates to a battery box and a battery module.

BACKGROUND

In recent years, the emergence of new energy vehicles has played a huge role in promoting social development and environmental protection. A power battery pack is a rechargeable battery that is the power source for the new energy vehicles and is widely used in the field of new energy vehicles. Among them, in order to ensure the overall structural strength of the battery pack and realize the safe driving of the car, the structural strength of the box of the battery module located inside the battery pack is also particularly important. At present, the box of the battery module usually encloses to form a containing cavity of a battery module box by welding end plates and side plates together. Among them, in order to meet the strength requirements of the expansion force of battery cells in the battery module, the end plate usually needs to be folded to form two upper and lower installation interfaces, and is fixed with a case of the battery pack through long bolts.

Although the method in the prior art can meet the strength requirements of the end plate of the battery module box to a certain extent, since the thickness of the end plate is thin, the installation interface is easily deformed by the tightening force formed by the bolt when the bolt is pre-tightened. This leads to insufficient installation strength.

SUMMARY

The purpose of the present application is to provide a battery box and a battery module, to alleviate the technical problem of the low structural strength of the end plate of the battery module box in the prior art.

The present application provides a battery box, including:
an end plate, wherein the end plate comprises a plurality of reinforcing members and a plurality of supporting members; each of the plurality of reinforcing members is parallel to a bottom surface of the battery box, at least one supporting member of the plurality of supporting members is provided between any two adjacent reinforcing members of the plurality of reinforcing members; connecting portions is provided at a location of the any two adjacent reinforcing members opposite to one of the at least one supporting member; wherein the plurality of reinforcing members and the plurality of supporting members are respectively formed by bending different positions of the end plate;

two of the end plate and the two side plates are configured to connect end to end in sequence to enclose a cavity of the battery box;
a connecting member of the battery box, wherein the connecting member of the battery box is configured to connect to a case of a battery pack through the connecting portions.

Further, a number of the plurality of reinforcing members is two, and the plurality of reinforcing members include:
a first reinforcing member, formed by bending a bottom of the end plate for
a plurality of times;
a second reinforcing member, formed by bending a top of the end plate for a plurality of times, where the first reinforcing member and the second reinforcing member are both located out of the cavity of the battery box.

Further, the first reinforcing member and the second reinforcing member both include:
two first bending portions arranged oppositely, where both the two first bending portions are provided with a plurality of first connecting holes corresponding to each other;
the plurality of first connecting holes are the connecting portions.

Further, a side portion of the end plate is configured to bend to form the plurality of supporting members, and each of the plurality of supporting members includes a through cavity; and the through cavity is configured to communicate with corresponding first connecting holes of the plurality of first connecting holes.

Further, it further includes:
a bottom plate, the bottom plate being the bottom surface of the battery box, where both the end plate and each of the two side plates are integrally formed with the bottom plate;
the end plates and each of the two side plates are respectively formed by bending the bottom plate, and the battery box is enclosed by the two of the end plate, the two side plates and the bottom plate.

Further, an end surface of one of the two side plates for connecting to the end plate is configured to bend to form at least one fastening member; and
the at least one fastening member is configured to correspondingly fastened on at least one of the plurality of supporting members.

Further, each of the two side plates is configured to bend to form a bending arm, the bending arm is parallel to the bottom surface of the battery box, and the bending arm is located out of the cavity of the battery box;
where the bending arm is provided with a second connecting hole, and the bending arm is configured to connect to the case of the battery pack through the second connecting hole by the connecting member.

Further, the bending arm includes:
two second bending portions arranged oppositely, where a plurality of second connecting holes corresponding to each other are provided on the two second bending portions.

Further, it further includes:
a pressing member, formed by extending along a top of each of the two side plates, where the pressing member is located in the cavity of the battery box.

The beneficial effects of the present application are:
The present application provides a battery box, which includes two end plates and two side plates, where the end plates and the side plates are connected end to end in sequence to enclose to form a cavity of the battery box;

where each of the end plates is respectively bent at different positions to form a plurality of reinforcing members and a plurality of supporting members, each of the reinforcing members is parallel to the bottom surface of the battery box, at least one supporting member is provided between any two adjacent reinforcing members; particularly the location where the reinforcing member is opposite to the supporting member is a connecting portion, and a connecting member of the battery box passes through the connecting portion and is connected to the box of a battery pack. The battery box is bent at different positions of the end plates to form a plurality of reinforcing members and a plurality of supporting members, and each of the reinforcing members is parallel to the bottom surface of the battery box. Thus, the reinforcing member can increase the structural strength of the end plates, to reduce or even avoid the deformation of the end plates caused by the expansion of the battery cell. Since a supporting member is provided between any two adjacent reinforcing members, the supporting member can provide a supporting force in the opposite direction of a tensioning force of the connecting member when the battery box is locked, and avoid the deformation of the reinforcing member caused by the tensioning force formed by the bolt when the connecting member is pre-tightened, so as to ensure the integrity of the reinforcing member and protect the structural strength of the entire end plate. Meanwhile, the supporting member located between two adjacent reinforcing member can also form a reinforcing portion of the end plates, and further reduce the deformation of the end plates caused by the expansion of the battery cell. In addition, since the reinforcing member is formed by bending the end plates, that is, the reinforcing member and the end plates are integrally formed, the structural strength of the entire end plates can be further improved.

The present application further provides a battery module, which includes a plurality of battery cell units stacked together, and the above-mentioned battery box;

where the plurality of the battery cell units stacked together are configured to accommodate in a cavity of the battery box.

Further, the plurality of the battery cell units are sandwiched between a pressing member and a bottom plate.

The beneficial effects of the present application are:

The battery module has the same advantages as the above-described battery box, and it will not be repeated here.

Another aspect of the present disclosure provides an apparatus including the battery module according to any of the above embodiments, wherein the battery module is adapted to provide power for the apparatus.

BRIEF DESCRIPTION OF THE DRAWINGS

In order to illustrate the implementation of the present application or the technical solution in the prior art more clearly, brief description will be made below to the drawings required in the implementation of the present application or the prior art, and apparently, the drawings described below are some implementations of the present application, and other drawings could be obtained based on these drawings by those ordinary skilled in the art without creative efforts.

ICON

Figure 1:
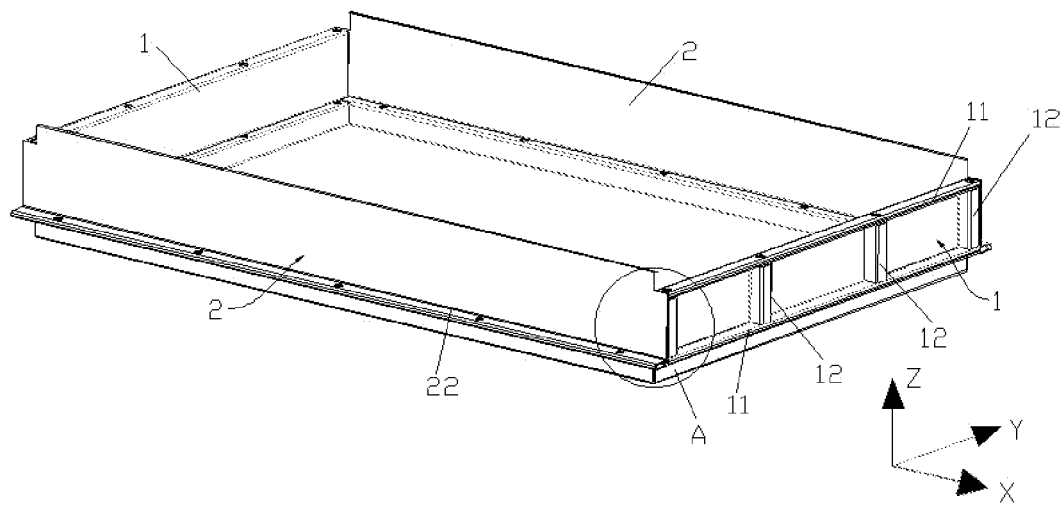
FIG. 1 is a schematic diagram of an assembled battery box provided by an embodiment of the present application.
Figure 2:
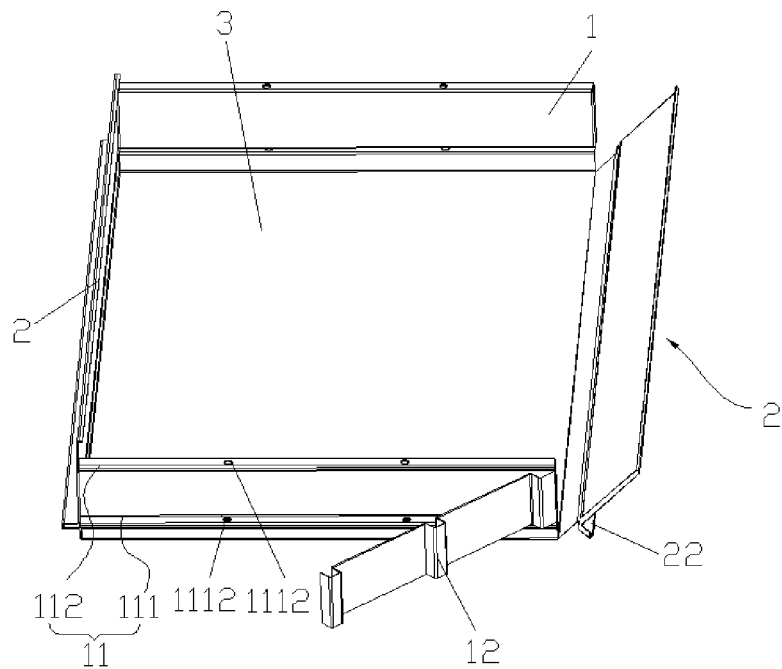
FIG. 2 is a schematic diagram of a structure of a battery box before assembly provided by an embodiment of the present application.
Figure 3:
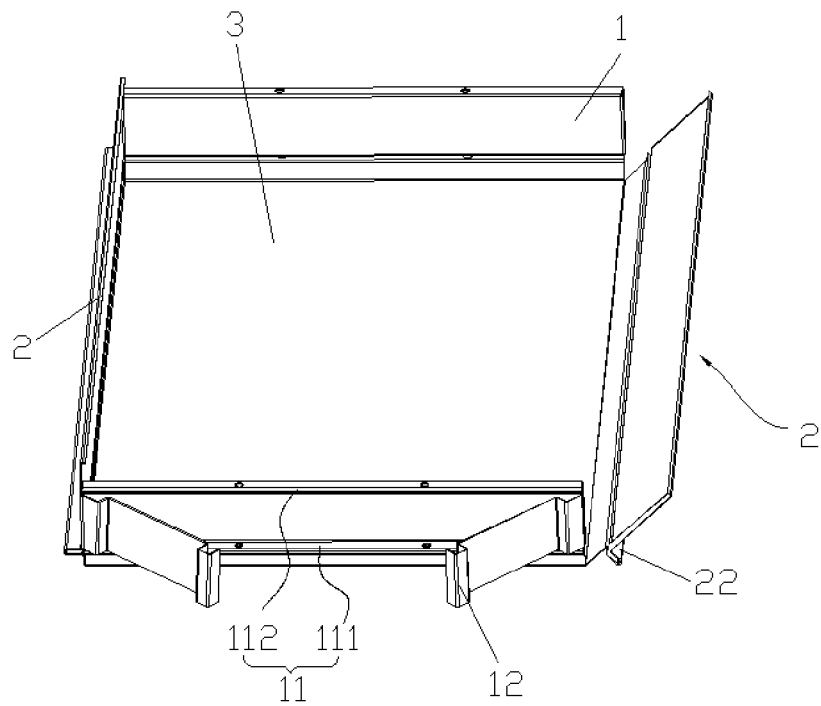
FIG. 3 is a schematic diagram of another structure of a battery box before assembly provided by an embodiment of the present application.
Figure 4:
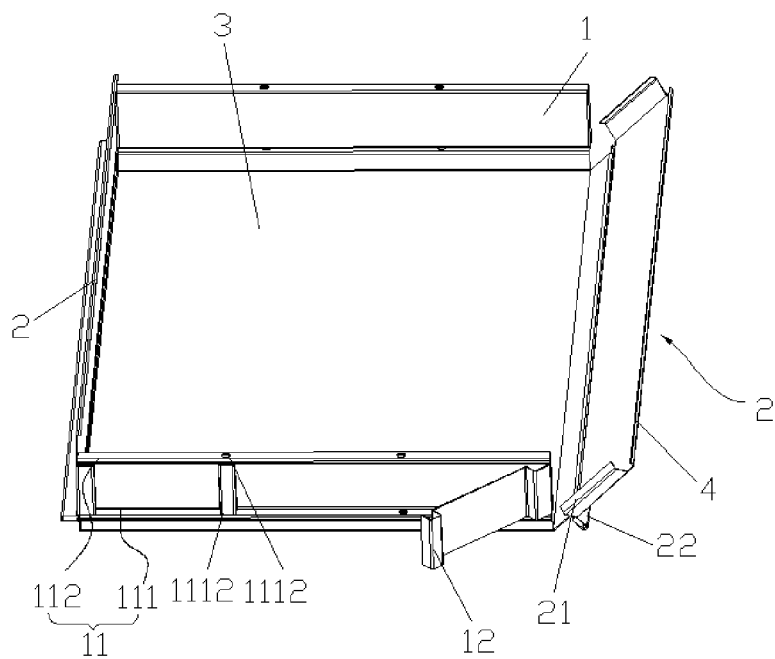
FIG. 4 is a schematic diagram of another structure of a battery box before assembly provided by an embodiment of the present application.
Figure 5:
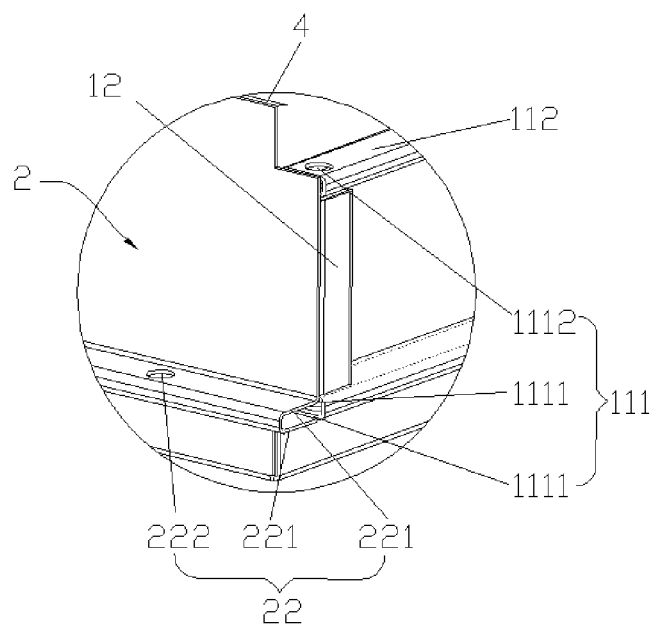
FIG. 5 is an enlarged view of A in FIG. 1.
Figure 6:
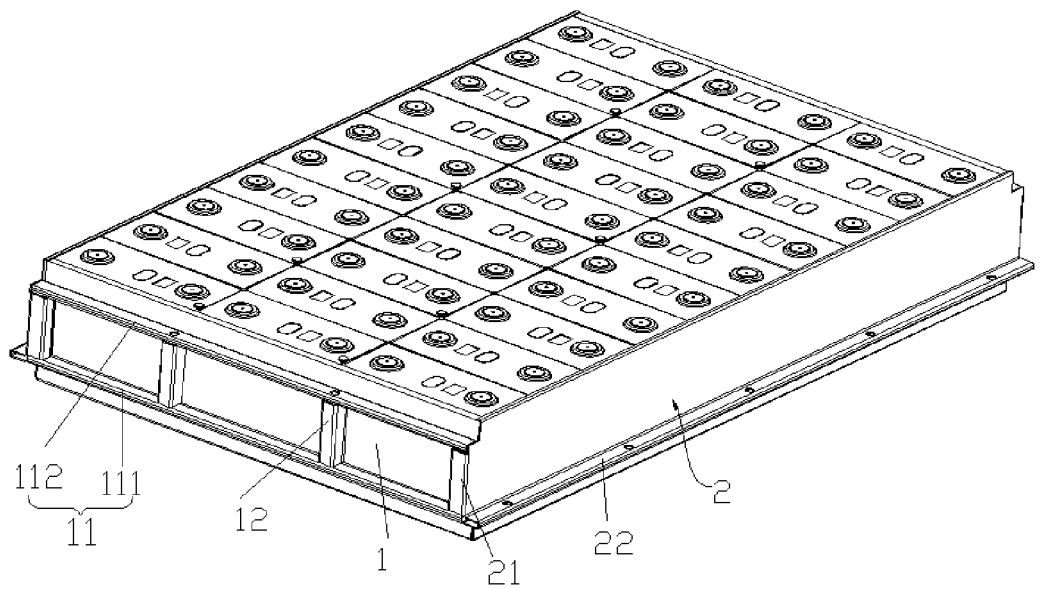
FIG. 6 is a schematic diagram of a structure of a battery box after being installed in a battery cell provided by an embodiment of the present application.

1—End plate;
   11—Reinforcing member;
      111—First reinforcing member;
         1111—First bending portion;
         1112—First connecting hole;
      112—Second reinforcing member;
   12—Supporting member;
2—Side plate;
   21—Fastening member;
   22—Bending arm;
      221—Second bending portion;
      222—Second connecting hole;
3—Bottom plate; and
4—Pressing member.

DESCRIPTION OF EMBODIMENTS

The technical solutions of the present utility model will be clearly and completely described below with reference to the accompanying drawings. Apparently, the described embodiments are some of, rather than all of, the embodiments of the present utility model. All other embodiments obtained by a person of ordinary skill in the art based on the embodiments of the present utility model without creative efforts shall fall within the protection scope of the present utility model.

In the description of the present utility model, it should be understood that orientations or positional relationships indicated by terms such as "inside" and "outside" are orientations or positional relationships shown based on the figures, and the terms are merely for convenience of describing the present utility model and for simplifying the description, but for indicating or implying that an indicated apparatus or element must have a specific orientation, and must be constructed and operated in a specific orientation, which thus may not be understood as limiting the present utility model.

In the description of the present utility model, it should be noted that unless otherwise explicitly specified and defined, the terms "mounting", "connecting" and "connection" should be understood in a broad sense, for example, they may be a fixed connection, a detachable connection, or an integrated connection, may be a mechanical connection, or may be an electrical connection; may be a direct connection and may also be an indirect connection via an intermediate medium, or may be communication between the interiors of two elements. A person of ordinary skill in the art can understand specific meanings of the foregoing terms in the present utility model according to a specific situation.

In particular, the battery module includes a battery box and a plurality of battery cells located in the battery box. In the present embodiment, the battery box includes two end plates 1 and two side plates 2, where the end plates 1 and the side plates 2 are connected end to end in sequence to enclose to form a cavity of the battery box; each of the end plates 1 is respectively bent at different positions to form a plurality of reinforcing members 11 and a plurality of supporting members 12, each of the reinforcing members 11 is parallel to the bottom surface of the battery box, at least one supporting member 12 is provided between any two adjacent reinforcing members 11; and particularly, the location where the reinforcing member 11 is opposite to the supporting member 12 is a connecting portion, where a connecting member of the battery box passes through the connecting portion and is connected to the box of a battery pack. The battery box is bent at different positions of the end plates 1 to form a plurality of reinforcing members 11 and a plurality of supporting members 12, each of the reinforcing members 11 is parallel to the bottom surface of the battery box. Thus, the reinforcing member 11 can increase the structural strength of the end plates 1, to reduce or even avoid the deformation of the end plates 1 caused by the expansion of the battery cell, and the instability where the end plates 1 and the side plates 2 connect. Since a supporting member 12 is provided between any two adjacent reinforcing members 11, the supporting member 12 can provide a supporting force in the opposite direction of a tensioning force of the connecting member when the battery box is locked, and avoid the deformation of the reinforcing member 11 caused by the tensioning force formed by the bolt, and the instability where the end plates 1 and the side plates 2 connect, when the connecting member is pre-tightened, so as to ensure the integrity of the reinforcing member 11 and protect the structural strength of the entire end plate. Meanwhile, the supporting member 12 located between two adjacent reinforcing member 11 can also form a reinforcing portion of the end plates 1, and further reduce the deformation of the end plates 1 caused by the expansion of the battery cell. In addition, since the reinforcing member 11 is formed by bending the end plates 1, that is, the reinforcing member 11 and the end plates 1 are integrally formed, the structural strength of the entire end plates 1 can be further improved.

Here, it should be supplemented that in the present embodiment, each reinforcing member 11 is parallel to the bottom surface of the battery box, that is, each reinforcing member 11 is arranged along the Y-axis direction.

In the present embodiment, in order to facilitate the fixing of the battery box and the case of the battery pack, the connecting member may be a bolt.

Among them, the battery box can be made of an aluminum material, a steel material, etc. In order to further improve the overall strength of the battery box, and at the same time, to ensure that the battery box has better extensibility, in some embodiments, the battery box is made of a steel material in the present embodiment.

Further, in order to facilitate the assembly and fixing of the battery cell and at the same time ensure the aesthetics of the battery box, the end plate 1 and the side plate 2 are vertically connected to each other.

Among them, the reinforcing member 11 may be one or multiple. In the present embodiment, the deformation of the end plates 1 caused by the expansion of the battery cell can be reduced or even avoided, and at the same time, the processing procedure is simplified. In some embodiments, there are two reinforcing members 11.

In particular, the reinforcing member 11 includes a first reinforcing member 111 and a second reinforcing member 112, where the first reinforcing member 111 is formed by bending the bottom of the end plate 1 for a plurality of times, and the second reinforcing member 112 is formed by bending the top of the end plate 1 for a plurality of times. The reinforcing member 11 can be located out of the cavity of the battery box, or in the cavity of the battery box. In order to improve the energy density and avoid the reinforcing member 11 from occupying the space in the battery box, in some embodiments, the first reinforcing member 111 and the second reinforcing member 112 are both located out of the cavity of the battery box.

Further, the top and bottom of the end plate 1 can be bent for a plurality of times to form the reinforcing members 11. In the present embodiment, in order to simplify the processing procedure, and at the same time, to improve the structural strength of the end plate 1, the bottom and top of the end plate 1 are bent twice, respectively, to correspondingly form the first reinforcing member 111 the second reinforcing member 112. In particular, both the first reinforcing member 111 the second reinforcing member 112 include two first bending portions 1111 arranged oppositely. Both the two first bending portions 1111 are provided with a plurality of first connecting holes 1112 corresponding to each other. The first connecting holes 1112 are connecting portions, and each of the supporting members 12 is arranged between the first connecting holes 1112 corresponding to each other.

When the battery box and the case of the battery pack are connected, the connecting member of the battery pack can avoid the supporting member 12 and pass through the connecting portions of the first reinforcing member 111 and the second reinforcing member 112. In order to facilitate the assembly of the connecting member, in the present embodiment, a side portion of the end plate 1 is bent to form a supporting member 12, the supporting member 12 includes a through cavity, and the through cavity of the supporting member 12 is communicated with the corresponding first connecting holes 1112.

Further, in order to make a contact surface of two ends of the supporting member 12 and the corresponding first reinforcing member 111 or the second reinforcing member 112 large enough, and further to better avoid the deformation of the first reinforcing member 111 and the second reinforcing member 112 caused by the tensioning force formed by the bolt when the connecting member is pre-tightened, in the present embodiment, the end surface of the supporting member 12 that abuts the first reinforcing member 111 or in some embodiments, the second reinforcing member 112 is rectangular.

The supporting member 12 abuts between the first reinforcing member 111 and the second reinforcing member 112, and upper and lower end surfaces of the supporting member 12 contact the second reinforcing member 112 and the first reinforcing member 111, respectively, and can provide a force in the opposite direction of the tensioning force of the bolt, to reduce or even avoid the deformation of the reinforcing member 11.

Among them, the battery cell in the battery box can be fixed to the battery box by bonding or bolting. In order to facilitate the assembly and fixing of the battery cell and the battery box, in the present embodiment, the battery box further includes a bottom plate 3. The end plates 1, the side plates 2, and the bottom plate 3 enclose to form the battery box, and the bottom plate 3 is the bottom surface of the battery box. The end plates 1, the side plates 2 and the bottom plate 3 can be connected together by bonding, clamping or welding. In order to further improve the overall structural strength of the battery box, in some embodiments, both the end plates 1 and the side plates 2 are integrally formed with the bottom plate 3, and the end plates 1 and the side plates 2 are respectively formed by bending the bottom plate 3.

The end surface of the side plate 2 for connecting to the end plate 1 can be connected to the end plate 1 by bonding or welding. In the present embodiment, in order to facilitate the assembly of the end plate 1 and the side plate 2, and simplify the assembly procedure, in particular, the end surface of the side plate 2 for connecting to the end plate 1 is bent to form at least one fastening member 21; and the fastening member 21 is correspondingly fastened on any one of or a plurality of the support members 12. With this design structure, the end plate 1 and the side plate 2 are directly clamped and buckled without welding, which reduces production costs and improves working efficiency.

Among them, in order to realize that the fastening member 21 and the supporting member 12 can be clamped, the fastening member 21 and the supporting member 12 are both bent along the same path. When the fastening member 21 and the supporting member 12 are clamped and fitted, one of the fastening member 21 and the supporting member 12 that is located on the external side is buckled to the one located on the internal side, and performs contour matching type snap connection.

Further, in order to improve the robustness of the connection between the battery box and the case of the battery pack, in the present embodiment, the side plate 2 is bent to form a bending arm 22, and the bending arm 22 is parallel to the direction that is vertical to end plate 1, where the bending arm 22 is provided with a second connecting hole 222, and the bending arm 22 passes through the second connecting hole 222 through a connecting member and is connected to the case of the battery pack. In particular, the bending arm 22 includes two second bending portions 221 arranged oppositely, where a plurality of second connecting holes 222 corresponding to each other are provided on the two second bending portions 221.

Among them, the bending arm 22 may be located in the cavity of the battery box. In order to improve the energy density and avoid the bending arm 22 from occupying the space in the battery box, the bending arm 22 is located out of the cavity of the battery box. Further, in the present embodiment, both the bending arm 22 and the reinforcing member 11 are arranged out of the cavity of the battery box, which can also avoid the connecting member from passing through the bottom plate 3 when the battery box is connected to the case of the battery pack. The integrity of the battery box is thus guaranteed, and the overall structural strength is improved.

Among them, the top of the side plate 2 does not need to be bent. In order to improve the stability of the battery cell in the battery box, in the present embodiment, the top of the side plate 2 extends outward to form a pressing member 4. The pressing member 4 is located in the cavity of the battery box, where the battery cell is sandwiched between the pressing member 4 and the bottom plate 3.

In the present embodiment, a battery module is provided. The battery module includes a plurality of battery cell units stacked together and the battery box according to any one of the above embodiments, where the plurality of the battery cell units stacked together are accommodated in the cavity of the battery box And sandwiched between a pressing member and a bottom plate 3.

The battery module has the same advantages as the battery box described in any one of the above embodiments, which has been clearly explained in the foregoing, and will not be repeated here.

The embodiments of the present disclosure further provide an apparatus, which includes a battery module according to any of the embodiments as described above, wherein the battery module is adapted to provide power for the apparatus. The apparatus may be an electric vehicle, a hybrid vehicle, an electric scooter, an electric cart or any other suitable devices which can include the battery module as their own power source.

Finally, it should be noted that: each of the above embodiments is merely used for illustrating rather than limiting the technical solutions of the present utility model. Although the present utility model is illustrated in detail with reference to each of the foregoing embodiments, those of ordinary skill in the art should understand that they can still modify the technical solutions described in the foregoing embodiments, or make equivalent substitutions to some of or all of the technical features therein, but these modifications or substitutions can be made to the respective technical solutions without departing from the scope of the technical solutions of the embodiments of the present application.

What is claimed is:

1. A battery box, comprising:

an end plate, wherein the end plate comprises a plurality of reinforcing members and a plurality of supporting members; each of the plurality of reinforcing members is parallel to a bottom surface of the battery box and each of the plurality of supporting members is perpendicular to the bottom surface of the battery box, at least one supporting member of the plurality of supporting members is provided between any two adjacent reinforcing members of the plurality of reinforcing members; wherein the plurality of reinforcing members and the plurality of supporting members are respectively formed by bending different positions of the end plate;

two end plates and two side plates are configured to connect end to end in sequence to enclose a cavity of the battery box;

a connecting member of the battery box, wherein the connecting member of the battery box is configured to connect to a case of a battery pack through the connecting portions;

wherein a number of the plurality of reinforcing members is two, and the plurality of reinforcing members comprise:

a first reinforcing member, formed by bending a bottom of the end plate for a plurality of times;

a second reinforcing member, formed by bending a top of the end plate for a plurality of times, wherein the first reinforcing member and the second reinforcing member are both located out of the cavity of the battery box;

wherein the first reinforcement member and the second reinforcement member both comprise:

two first bending portions arranged oppositely, wherein both the two first bending portions are provided with a plurality of first connecting holes corresponding to each other;

the plurality of first connecting holes are the connecting portions; and wherein a side portion of the end plate is configured to bend to form the plurality of supporting members, and each of the plurality of supporting members comprises a through cavity; and the through cavity is configured to communicate with corresponding first connecting holes of the plurality of first connecting holes.

2. The battery box according to claim 1, further comprising:
a bottom plate, the bottom plate being the bottom surface of the battery box, wherein both the end plate and each of the two side plates are integrally formed with the bottom plate;
the end plate and each of the two side plates are respectively formed by bending the bottom plate, and the battery box is enclosed by the two of the end plate, the two side plates and the bottom plate.

3. The battery box according to claim 1, wherein an end surface of one of the two side plates for connecting to the end plate is configured to bend to form at least one fastening member;
the at least one fastening member is configured to correspondingly fasten on at least one of the plurality of support members.

4. The battery box according to claim 1, wherein each of the two side plates is configured to bend to form a bending arm, and the bending arm is parallel to the bottom surface of the battery box, and the bending arm is located out of the cavity of the battery box;
wherein the bending arm is provided with a second connecting hole, and the bending arm is configured to connect to the case of the battery pack through the second connecting hole by the connecting member.

5. The battery box according to claim 4, wherein the bending arm comprises:
two second bending portions arranged oppositely, wherein a plurality of second connecting holes corresponding to each other are provided on the two second bending portions.

6. The battery box according to claim 1, further comprising:
a pressing member, formed by extending along a top of each of the two side plates, wherein the pressing member is located in the cavity of the battery box.

7. A battery module, comprising:
a plurality of battery cell units stacked together and the battery box according to claim 1;
wherein the plurality of the battery cell units stacked together are configured to accommodate in the cavity of the battery box.

8. The battery module according to claim 7, wherein the battery box further comprises:
a bottom plate, the bottom plate being the bottom surface of the battery box, wherein both the end plate and each of the two side plates are integrally formed with the bottom plate;
the end plate and each of the two side plates are respectively formed by bending the bottom plate, and the battery box is enclosed by the two of the end plate, the two side plates and the bottom plate.

9. The battery module according to claim 7, wherein an end surface of one of the two side plates for connecting to the end plate is configured to bend to form at least one fastening member;
the at least one fastening member is configured to correspondingly fasten on at least one of the plurality of the support members.

10. The battery module according to claim 7, wherein each of the two side plates is configured to bend to form a bending arm, and the bending arm is parallel to the bottom surface of the battery box, and the bending arm is located out of the cavity of the battery box;
wherein the bending arm is provided with a second connecting hole, and the bending arm is configured to connect to the case of the battery pack through the second connecting hole by the connecting member.

11. The battery module according to claim 10, wherein the bending arm comprises:
two second bending portions arranged oppositely, wherein a plurality of second connecting holes corresponding to each other are provided on the two second bending portions.

12. The battery module according to claim 7, wherein the battery box further comprises:
a pressing member, formed by extending along a top of each of the two side plates, wherein the pressing member is located in the cavity of the battery box.

13. The battery module according to claim 12, wherein the battery box further comprises:
a bottom plate, the bottom plate being the bottom surface of the battery box, wherein the battery box is enclosed by the two of the end plates, the two side plates and the bottom plate, and the plurality of the battery cell units are configured to sandwich between the pressing member and the bottom plate.

14. An apparatus, comprising the battery module according to claim 7, wherein the battery module is adapted to provide power for the apparatus.

15. The battery box according to claim 1, wherein the end surface of the supporting member that abuts the first reinforcing member or the second reinforcing member is rectangular.

16. The battery box according to claim 1, wherein the through cavity is enclosed by the side portion of the bent end plate and the unbent end plate.

* * * * *